(12) United States Patent
Hong

(10) Patent No.: US 6,415,145 B1
(45) Date of Patent: Jul. 2, 2002

(54) METHOD FOR HANDLING AN ALARM ACCORDING TO CHANNEL CARD TYPE IN A CELLULAR COMMUNICATION SYSTEM

(75) Inventor: Seok-Joo Hong, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/170,588

(22) Filed: Oct. 13, 1998

(30) Foreign Application Priority Data

Oct. 13, 1997 (KR) .............................................. 97-52325

(51) Int. Cl.[7] ................................................. H04Q 7/34
(52) U.S. Cl. ........................... 455/424; 455/561; 455/9; 455/67.1
(58) Field of Search ................................. 455/423, 424, 455/404, 403, 9, 67.1, 67.7, 550, 561

(56) References Cited

U.S. PATENT DOCUMENTS 5,394,459 A * 2/1995 Djuphammar et al. ...... 455/423
5,469,494 A * 11/1995 Oritz Perez et al. .... 455/424 X
6,009,324 A * 12/1999 Pravitz et al. .............. 455/423

* cited by examiner

Primary Examiner—William Trost
Assistant Examiner—Philip J. Sobutka
(74) Attorney, Agent, or Firm—Dilworth & Barrese, LLP

(57) ABSTRACT

A method for handling an alarm that occurs when an administrator changes channel cards in a digital cellular system. The method includes the step of checking the changed information, terminating the process of handling the alarm if a wrong channel card is inserted, setting up an identification number of the CIP(Channel Interface Processor) and the number of the iteration counts per form, setting up the location of the channel element, setting up the alarm code to the corresponding type which was previously assigned, checking whether an alarm occurred, clearing the alarm if an alarm is recognized to have occurred, setting up the location of the channel card, checking whether the alarm of the channel card had occurred, clearing the alarm if an alarm is recognized to have occurred, reading the form information, increasing the identification number of CIP by two and determining whether the steps from the step of setting up the location of the channel element are performed as many times as the iteration counts and the number of the iteration counts per form. The method reduces the administrator's manual work and enhances the feasibility of utilizing the system.

15 Claims, 4 Drawing Sheets

FIG. 3

| CEUR | |
|---|---|
| (1FA) | (2FA) |
| CIP0(α) | CIP1(α) |
| CIP2(β) | CIP3(β) |
| CIP4(γ) | CIP5(γ) |

| CEUR | |
|---|---|
| (3FA) | (4FA) |
| CIP6(α) | CIP7(α) |
| CIP8(β) | CIP9(β) |
| CIP10(γ) | CIP11(γ) |

| CEUR1 | | |
|---|---|---|
| (5FA) | (6FA) | (7FA) |
| CIP12(α) | CIP13(α) | CIP18(α) |
| CIP14(β) | CIP15(β) | CIP19(β) |
| CIP16(γ) | CIP17(γ) | CIP20(γ) |

FIG. 4

| CEUR | |
|---|---|
| CIP0(1FA) | CIP1(2FA) |
| CIP2(3FA) | CIP3(4FA) |
| CIP4(5FA) | CIP5(6FA) |

METHOD FOR HANDLING AN ALARM ACCORDING TO CHANNEL CARD TYPE IN A CELLULAR COMMUNICATION SYSTEM

BACKGROUND

1. Technical Field

The present application relates generally to a cellular communication system and, in particular, to a method for handling an alarm according to a change in the type of channel card in a CEUR (Channel Element Unit Rack) of a digital cellular system.

2. Description of Related Art

In general, mobile communication systems such as PCS (Personal Communication Service) and CDMA (Code Division Multiple Access) systems include a plurality of BTS (Base Station Transceiver Subsystem) for serving mobile terminals located in corresponding regions, a plurality of BSCs (Base Station Controllers), a plurality of BSMs (Base Station Manager Systems) for managing and controlling a plurality of BSCs and BTSs, a plurality of MSCs (Mobile Switching Centers), and a plurality of HLRs (Home Location Registers).

A communication system which operates per unit cell is called a cellular system. The term "cell" refers to an area which is covered by a BTS, and a cell is generally divided into one omni-cell or three sector cells. The service area which this cell covers hierarchically expands from a BTS area to a BSC area and to a MSC area. A mobile station in a given cell communicates with the BTS designated to the cell via communication channels. A forward channel refers to a communication link formed from the BTS to the mobile station, and a reverse channel refers to a communication link formed from the mobile station to the BTS. The forward channels that are typically formed from the BTS to the mobile station include a pilot channel, a sync channel, a paging channel, and a plurality of forward traffic channels. The reverse channels that are typically formed from the mobile station to the BTS include an access channel and a reverse traffic channel. The mobile station and the BTS transmit and receive voice and data by utilizing the traffic channels.

Each BTS is assigned operating frequencies according to its system capacity, and each frequency channel is called a FA (Frequency Assignment). In general, a CDMA (Code Division Multiple Access) communication system contains a plurality of access channels on a single frequency channel, the different access channels being separated by different frequency offsets and coding sequences.

The main processor of the BSC is called a CCP (Call Control Processor), and the main processor of the BSM is called a BCP (BTS Control Processor). In addition to these processors, a CDMA and PCS system utilizes the following processors: an ACP (Alarm Control Processor); an alarm processor for BER (Bit Error Rate) between the BSC and the BTS for controlling a clock device and receiving synchronization signals from a GPS receiver so as to clock synchronize a call from the BTS; a CSP(Common Channel Signaling Processor) for transmitting signal information without error between the BTS and the BSC; a SIP (Selector Interface Processor) (which operates in the link layer) for controlling call connection and a radio link; a SVP (Selector and Vocoder Processor) for modulating and demodulating voice data; a CIP (Channel Interface Processor) for managing channel elements and controlling the interface; a TIP (Transceiver Interface Processor) for managing a transceiver and controlling the interface; and BTP (BTS Test Processor) for connecting a terminal to a BTS so as to test the functions.

In addition, high capacity inter-processor communication node processor board assemblies such as a GHIPA (Gateway High Capacity Inter Processor Communication Node Processor Board Assembly) connected to the BSM, a LHIPA (Link High Capacity Inter Processor Communication Node Processor Board Assembly) connected to the BSC, and a BHIPA (BTS High Capacity Inter Processor Communication Node Processor Board Assembly) may be included.

An alarm which occurs in the above-structured digital cellular system is handled through the BSM by informing an administrator whether or not a specific device is properly working. Specifically, after a physical location table is generated, when the BTSs and devices of the BSC are working abnormally, the system informs the administrator of each corresponding physical location so as to inform the administrator of the alarm. In order to handle an alarm signal properly, device names and a maximum equipment number, a shelf, and a rack, which comprise each system must be predefined when the physical location table is generated. If the above-mentioned items are changed, a new physical location table must be generated again to incorporate the changes.

The digital cellular communication systems mentioned above also, in general, include a DCEA (Digital Channel Element Assembly) which is a channel card with a capacity of four channels, and an ECEA (Eight Channel Element Assembly) which is a channel card with an eight channel capacity.

Conventionally, when handling an alarm, the channel card is typically defined as a DCEA type in the physical location table, and an alarm generated in a ECEA-equipped system is handled as an exceptional case. The types of the channel cards that are utilized must be defined according to the system so as to handle the alarm of the different channel card types. After changing a channel card, each BTS and BSC must initialize the files which contain information regarding a previously-occurred alarm. To accomplish this, after deleting the existing files, the processor which handles the upper-rank alarm must be terminated and regenerated, so as to read the information of the changed channel card. The upper-rank alarm processor (or the FLMX (Fault Management Processor)) then collects alarm information transmitted from each BTS and BSC and informs the administrator of the alarm information visually and audibly.

Referring now to FIG. 1, a diagram illustrates a rack of the channel card of the BTS. Each CEBB (Channel Element Back Board) has two kinds of channel cards, i.e., the DCEA and the ECEA. Each CEBB, which is comprised of either 4 ECEAs or 8 DECAs, supports 32 channel elements. The areas denoted by "blank" represent empty slots and a plurality of fans are included to cool the rack. The system of FIG. 1 also includes an ACCA (Analog common Card Assembly).

A conventional method for handling the alarm executed by the FLMX will now be discussed. Initially, in order to change the channel cards, the power supply to the rack equipped with the channel cards must be turned off. The changes of the channel cards are performed per unit FA. If a user turns off the rack power, an alarm will occur in the FA of the corresponding rack, and the alarm will be reported to the administrator. The user may then change the old channel card type to a new channel card type and turn the power on. Thereafter, a new alarm will occur in the newly changed channel card or other devices (except the rack), and the FLMX reports the alarm to the administrator.

But since the old alarm of the previous channel card has already occurred, the new alarm cannot be recognized and remains. The data of the file which stores the existing alarm data of the corresponding BSC must be deleted so as to remove the old alarm. In addition, the FLMX must be killed so that the new (i.e., different type of) channel card can be read. A file can then be generated so as to recognize the new alarm.

With this conventional method, because the new alarm data reported to the FLMX cannot be stored to the file, the new alarm data generated from the new channel card may be lost. As a result, the alarm generated from the system is not identical with the alarm information reported to the administrator.

Therefore, in order to restore the alarm information normally, the alarm information should be requested from the lower processors (i.e., the BCP) so that the real state of the system may be identical with the alarm information. Particularly, the conventional method for handling the alarm requires the following additional process.

First, the administrator must manually remove the files which store the alarm information of the previous channel card. Second, the FLMX must be killed and generated again, so as to regenerate a file. Third, the system must request the lower processors of the alarm information, so that the alarm information which may be lost be identical with that of the real system.

There are several problems associated with the conventional method discussed above. For instance, the method results in time waste and other difficulties since the administrator must manually type the command codes and perform them. In addition, it is not proper for the FLMX (i.e., the upper processor for handling the alarm) to make identical the real state of the system and the alarm information.

SUMMARY OF THE INVENTION

It is therefore an object of the present invention to provide a method for handling the alarm according to the changeable channel card types without killing the FLMX and requesting alarm information to the lower processor (or BCP).

In one aspect, a method for handling an alarm when changing channel card types in a digital cellular communication system, comprises the steps of:

(a) replacing an old channel card type with a new channel card type and checking changed information;

(b) setting up an identification number of a CIP (Channel Interface Processor) and a number of iteration counts based on a form of BTS;

(c) setting up a location of a channel element which will be handled per CIP by utilizing the identification number of the CIP;

(d) determining a channel element type in the location of channel element and assigning an alarm code for the channel element type;

(e) determining whether an alarm occurs in the location of the channel element and clearing the alarm if it is determined that an alarm occurs;

(f) setting up the location of the new channel card by utilizing the old channel card type and the location of the channel element and re-setting the identification number of the CIP;

(g) determining whether steps (c) through (f) have been iterated a maximum number of times and returning to step (c) if it is determined that the steps (c) through (f) have not been performed a maximum number of times, the maximum number of times being equal to the maximum number of channel elements per CIP;

(h) reading and storing changed form information per channel element if it is determined that the steps (c) through (f) were iterated the maximum number of times;

(i) increasing the CIP identification number by two so as to process a next alarm; and (j) determining whether steps (c) through (i) have been iterated for the number of iteration counts set up in step (b), returning to step (c) if it is determined that steps (c) through (i) have not been iterated for the number of iteration counts, and terminating the process of handling the alarm if it is determined that steps (c) through (i) have been iterated for the number of iteration counts.

These and other aspects, object and advantages of the present invention will become apparent in the following description of preferred embodiments which is to be read in connection with the accompanying drawings.

BRIEF DESCRIPTION OF THE DRAWINGS

FIG. 3 illustrates a schematic diagram of a CIP of a rack of a channel element in a BTS of a sector form;

FIG. 4 illustrates a schematic diagram of a CIP of a rack of a channel element in a BTS of an omni form.

DETAILED DESCRIPTION OF PREFERRED EMBODIMENTS

In a system utilizing the present method, after the channel card change is reported to the FLMX, the administrator will manually remove the alarm which occurred in the corresponding FA which is equipped with the new channel card. Consequently, the FLMX does not have to be killed and regenerated in order to remove the files regarding the existing alarm data or in order to regenerate the removed files since the FLMX reads the changed channel card. Advantageously, this enables the FLMX to handle the alarm generated by the BCP due to the new channel card type without having to be killed and request alarm information from the lower processors (i.e., BCPs) again.

The process that an administrator will perform in accordance with the present method after the channel card type is changed will now be discussed. After changing the channel card, the form information is modified with the form of the newly changed channel card in the block which manages the forms. After being reported to the FLMX that this command is performed, the FLMX handles the alarm process.

In the process of handling the alarm by the FLMX (the upper processor for handling the alarm) the FLMX generates a file in which the information from the lower alarm handling block is stored per BSC. When the FLMX receives reports of the alarm information from the alarm handling block and stores them to the alarm information file of the corresponding BSC, the FLMX informs the administrator of the physical location of the form in which the alarm occurred via the BSM.

Figure 1:
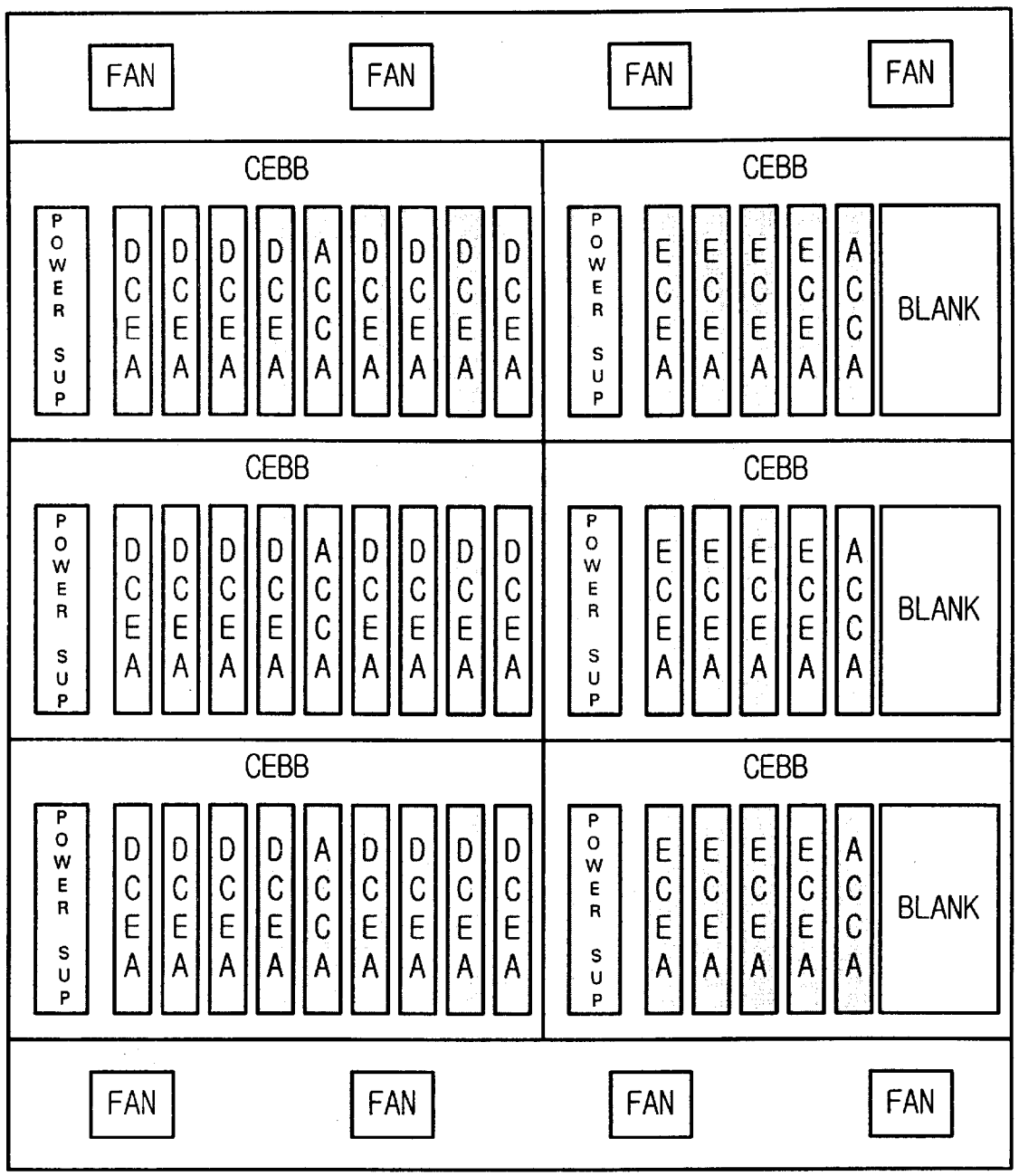
FIG. 1 illustrates a schematic diagram of a channel card rack of a BTS.
Figure 2:
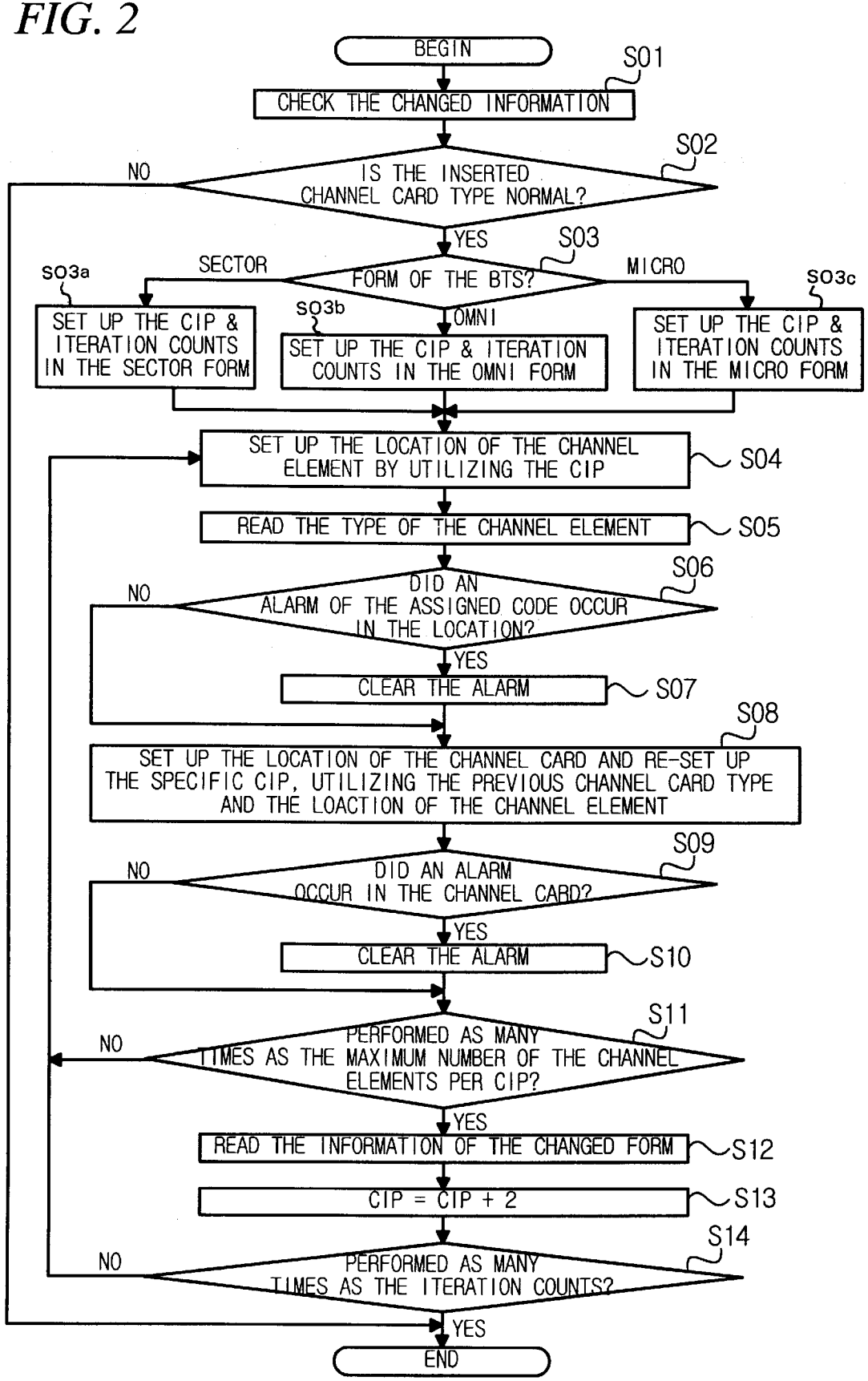
FIG. 2 illustrates a flow diagram for handling an alarm by a FLMX in accordance with one aspect of the present invention.

Referring now to FIG. 2, a flow diagram illustrates a method for handling an alarm by a FLMX according to the present invention. Initially, the changed information (i.e., the BSC with changed channel card, the BCP, the FA, the previous channel card type, and the new channel card type) is checked (step S01). Next, a determination is made as to whether the channel card type is normal (step S02). If the channel card type is found to be abnormally inputted (negative determination in step S02), the alarm process is termninated. If, on the other hand, the channel card type input is normal (affirmative decision in step S02), a determination is made as to the form of the BTS (step S03). In particular, it is determined whether the current BTS form is a sector, omni, or micro form. Once the BTS form is determined, the identification number of the CIP and the iteration counts for the form are set up (step S03a, S03b or S03c). Specifically, the method for assigning the identification number of the CIP and the iteration counts according to the form of the BTS will be discussed with reference to FIG. 3 which illustrates a schematic diagram of the CIP of the rack of the channel element in the sector form BTS. As illustrated, a CEUR has 2 FAs and each FA (i.e., 1FA to 7FA) has a CIP according to each α, β, and γ sector. Each CIP is numbered in the order of α, β and γ of each FA. Since CEUR1 has 3 FA s, the third FA (i.e., 7FA) is numbered differently (as illustrated). The remaining two types have the same identification number of the CIP. EQ. 1 below illustrates an algorithm for inferring the identification number of the CIP and the iteration counts by utilizing the identification number of the FA in the sector form (i.e., step S03a in FIG. 2), whereby fa_id is the identification number of the FA (which is utilized by the BTS); cip_id is the identification number of the CIP; and end_loop is the iteration counts.

Figure 5:
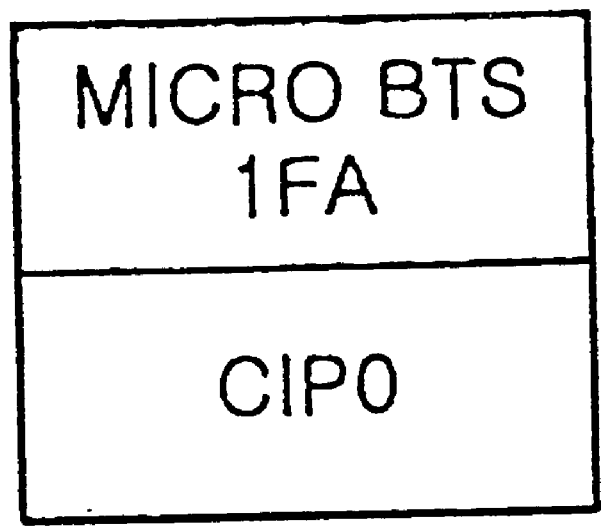
FIG. 5 illustrates a schematic diagram of the CIP of a rack of a channel element in a BTS of a micro form.

EQ. 1 if(fa_id%2==0)
    cip_id=(fa_id/2)*6;
else
    cip_id=(fa_id/2)*6+1;
end_loop=3;

Referring to FIG. 4, a schematic diagram illustrates a CIP of the rack of the channel element in the BTS of the omni form. As illustrated, a CEUR has six FAs, and each FA has a respective CIP. EQ. 2 below illustrates a method for inferring the identification number of the CIP and the iteration counts by utilizing the identification number of the FA in the omni form (step S03b in FIG. 2):

EQ. 2 cip_id=fa_id;

end_loop=1;

Referring now to FIG. 5, a schematic diagram illustrates a CIP of the rack of the channel element in the BTS of the micro form. As illustrated, because the micro form utilizes a single FA per BTS, the micro form has a rack which contains eight DCEAs or four ECEAs. EQ. 3 below illustrates an algorithm for inferring the identification number of the CIP and the iteration counts by utilizing the identification number of the FA in the micro form (step S03c in FIG. 2).

EQ. 3 cip_id=0;

end_loop=1;

Referring again to FIG. 2, after setting up the identification number of the CIP and the iteration counts according to each BTS form (steps S03a, S03b and/or S03c), the location of the channel element to be handled per CIP is set up by utilizing the set up identification number of the CIP (step S04). In particular, EQ. 4 below illustrates an algorithm for setting up the location of the channel element to be handled per CIP, whereby ce_id is the identification number of the channel element; and MAX_CE_PER_CIP is the maximum number of the channel element connected to a CIP and defined as '32'.

EQ. 4 for(ce_id=0; ce_id<MAX_CE_PER_CIP; ce_id++)
if(cip_id==20)
    cip_id=19;
    loc_id=(cip_id*MAX_CE_PER_CIP)+ce_id;
else if(cip_id==2)
    cip_id=20;
    loc_id=(cip_id*MAX_CE_PER_CIP)+ce_id;
else
    loc_id=(cip_id*MAX_CE_PER_CIP)+ce_id;

After setting up the location of the channel element, the channel element type of the location previously set up (in step S04) is checked and the alarm code assigned to the corresponding type is set up (step S05). Next, a determination is made as to whether an alarm occurs in the location which was set up (step S06). If an alarm does occur (affirmative decision in step S06), the alarm is removed (step S07). If, on the other hand, an alarm does not occur (negative determination in step S06), or after the alarm is cleared (step S07), the location of the assigned channel card is set up by utilizing the previous channel card type and the location of the channel element (step S08). In addition, in case of the 7FA of the CEUR1 of the sector form, the specific identification number of the CIP is re-set up (step S08). In particular, EQ. 5 below illustrates an algorithm for setting up the location of the channel card and re-setting up the specific identification number of the CIP whereby, cc_old_type is the previous type of the channel card.

EQ.5 if((cc_old_type==DCEA)&&((ce_id%4)==0))
    loc_id=(cip id*MAX_CC_PER_CIP)+(ce_id/4);
else if((cc_old_type==ECEA)&&((ce_id%8)==0))
    loc_id=(cip_id*MAX_CC_PER_CIP)+(ce_id/8);
else continue;

Next, a determination is made as to whether an alarm occurs in the channel card in the location which is set up (step S09). If an alarm is determined to have occurred (affirmative determination in step S09), the alarm is removed (step S10). If an alarm is determined to not have occurred (negative decision in step S09), or after the alarm in cleared (step S10), a determination is made as to whether step S04 through step S10 has been performed the maximum amount of times as the maximum number of the channel elements per CIP (step S11). If not (negative determination in step S11), then the steps S04 through S10 are performed again. If so (affirmative determination in step S11), the changed form information per channel is read and stored (step S12).

Next, the identification number is added by two so that the method for handling the alarm for the next CIP may be executed (step S13). A determination is then made as to whether the process comprising steps S04 through S13 are performed as many times as the set up iteration counts (step S14). If not (negative determination in step S14), then steps S04 through S13 are performed again, and if the iteration is finished (affirmative determination in step S14), then the process for handling the alarm according to the present invention is terminated.

What is claimed is:

1. A method for handling an alarm by a block that manages channel element information and an alarm handling processor which handles alarms, when changing channel card types in a digital cellular communication system after replacing a first channel card type with a second channel card type, comprising the steps of:

(a) after changing the channel card types, modifying the channel element information with information of the second channel card type in the block that manages the channel element information, said modified channel element information includes BSC (Base Station Controller) information, second channel card type information, BCP (BTS Control Processor) information, FA (Frequency Assignment) information, first channel card type, and second channel card type;

(b) informing the alarm handling processor by the block that manages the channel element information that the channel card type has been changed;

(c) checking the modified channel element information by the alarm handling processor; and (d) based on a BTS, sequentially determining by the alarm handling processor an alarm occurred in one or more channel elements and the channel cards, and if it is determined that an alarm has occurred, removing the alarm and reading and storing the modified channel element information in the block that manages the channel element information;

(e) setting up an identification number of a CIP (Channel Interface Processor) and a number of iteration counts based on the channel element information of the BTS;

(f) setting up a location of a channel element which will be handled per CIP by utilizing said identification number of said CIP;

(g) determining a channel element type in said location of channel element and assigning an alarm code for said channel element type;

(h) determining whether an alarm occurs in said location of said channel element and clearing said alarm if it is determined that an alarm occurs;

(i) setting up the location of said second channel card by utilizing said first channel card type and said location of said channel element and re-setting said identification number of said CIP;

(j) determining whether steps (f) through (i) have been iterated a maximum number of times and returning to step (f) if it is determined that said steps (f) through (i) have not been performed a maximum number of times, said maximum number of times being equal to the maximum number of channel elements per CIP;

(k) reading and storing changed form information per channel element if it is determined that said steps (f) through (i) were iterated said maximum number of times;

(l) increasing the CIP identification number by two so as to process a next alarm; and (m) determining whether steps (f) through (l) have been iterated for the number of iteration counts set up in step (e), returning to step (f) if it is determined that steps (f) through (l) have not been iterated for the number of iteration counts, and terminating the process of handling the alarm if it is determined that steps (f) through (l) have been iterated for the number of iteration counts.

2. The method of claim 1, further comprising the steps of:
determining whether the second channel card type is normal based on said changed information; and
terminating the process of handling said alarm if it is determined from said changed information that an abnormal channel card is inserted.

3. The method of claim 1, wherein said step of setting up said identification number of said CIP (Channel Interface Processor) and said number of iteration counts is performed for each form of BTS (Base Transceiver Station) by determining whether the current form of said BTS (Base Transceiver Station) is one of a sector, an omni, and a micro form.

4. The method of claim 3, wherein if it is determined that the BTS is of the sector form, said step of setting up the identification number of the CIP and the number of the iteration counts per form computes the identification number of the CIP and the iteration counts based on the following:
    if(fa_id%2==0)
        cip_id=(fa_id/2)*6;
    else
        cip_id=(fa_id/2)*6+1;
    end_loop=3;
    where, fa_id is the identification number of the FA;
        cip_id is the identification number of the CIP; and
        end_loop is the iteration counts.

5. The method of claim 3, wherein if it is determined that the BTS is of the omni form, said step of setting up the identification number of the CIP and the number of the iteration counts per form computes the identification number of the CIP and the iteration counts based on the following:
    cip_id=fa_id;
    end_loop=1;
    where, fa_id is: the identification number of the FA;
        cip_id is the identification number of the CIP; and
        end_loop is the iteration counts.

6. The method of claim 3, wherein if it is determined that the BTS is of the micro form, said step of setting up the identification number of the CIP and the number of the iteration counts per form computes the identification number of the CIP and the iteration counts based on the following:
    cip_id=0;
    end_loop=1;
    where, cip_id is the identification number of the CIP; and
        end_loop is the iteration counts.

7. The method of claim 3, wherein if it is determined that the BTS is of an omni form, said step of setting up the identification number of the CIP and the number of the iteration counts per form computes the identification number of the CIP and the iteration counts based on the following:
    cip_id=fa_id;
    end_loop=1;
    where fa_id: the identification number of the FA;
        cip_id is the identification number of the CIP; and
        end_loop: the iteration counts.

8. The method of claim 4, wherein if it is determined that the BTS is of the sector form, said step of setting up the identification number of the CIP and the number of the iteration counts per form computes the identification number of the CIP and the iteration counts based on the following:
    if(fa_id%2==0)
        cip_id=(fa_id/2)*6;
    else
        cip_id=(fa_id/2)*6+1;
    end_loop=3;
    where fa_id is the identification number of the FA;
        cip_id is the identification number of the CIP; and
        end_loop is the iteration counts.

9. The method of claim 8, wherein said step of setting up the location of the channel element which will be handled per CIP is based on the following:
    for(ce_id=0; ce_id<MAX_CE_PER_CIP; ce_id++)
        if(cip_id==20)

```
    cip_id=19;
    loc_id=(cip id*MAX CE_PER_CIP)+ce_id;
else if(cip_id==2)
    cip_id=20;
    loc_id=(cip_id*MAX_CE_PER_CIP)+ce_id;
else
    loc_id=(cip_id*MAX_CE_PER_CIP)+ce_id;
where cip_id is the identification number of the CIP;
    loc_id is the location of the channel element to be
        performed per CIP;
    ce_id is the identification number of the channel
        element; and
    MAX_CE_PER_CIP is the maximum number of
        channel elements per CIP.
```

10. The method of 9, wherein said MAX_CE_PER_CIP is defined as '32'.

11. The method claim 10, wherein said step of re-setting up the identification number of said specific CIP is based on the following:

```
if((cc_old_type==DCEA)&&((ce_id%4)==0))
    loc_id=(cip_id*MAX_CC_PER_CIP)+(ce_id/4);
else if((cc_old_type==ECEA)&&((ce id%8)==0))
    loc_id=(cip_id*MAX_CC_PER_CIP)+(ce_id/8);
else continue;
where cc_old_type is the old channel card type;
    DECA(Digital Channel Element Assembly) is the
        channel card including 4 channel elements;
    ECEA (Eight Channel Element Assembly) is the chan-
        nel card including 8 channel elements;
    ce_id is the number of the channel elements;
    MAX_CC_PER_CIP is the maximum number of
        channel cards;
    loc_id is the location of the channel element to be
        processed per corresponding CIP; and
    cip_id is the identification number of CIP.
```

12. The method of claim 3, wherein if it is determined that the BTS is of the micro form, said step of setting up the identification number of the CIP and the number of the iteration counts per form computes the identification number of the CIP and the iteration counts based on the following:

```
    cip_id=0;
    end_loop=1;
where cip_id is the identification number of the CIP; and
    end_loop is the iteration counts.
```

13. The method of claim 12, wherein said step of setting up the location of the channel element which will be handled per CIP is based on the following:

```
for(ce_id=0; ce_id<MAX_CE_PER_CIP; ce_id++)
    if(cip_id==20)
        cip_id=19;
        loc_id=(cip_id*MAX_CE_PER_CIP)+ce_id;
    else if(cip_id==2)
        cip_id=20;
loc_id=(cip_id*MAX_CE_PER_CIP)+ce_id;
    else
        loc_id=(cip_id*MAX_CE_PER_CIP)+ce_id;
where cip_id is the identification number of the CIP;
    loc_id is the location of the channel element to be
        performed per CIP;
    ce_id is the identification number of the channel
        element; and
    MAX_CE_PER_CIP is the maximum number of
        channel elements per CIP.
```

14. The method of 13, wherein said MAX_CE_PER_CIP is defined as '32'.

15. The method claim 14, wherein said step of re-setting up the identification number of said specific CIP is based on the following:

```
if((cc_old_type==DCEA)&&((ce_id%4)==0))
    loc_id=(cip_id*MAX_CC_PER_CIP)+(ce_id/4);
else if((cc_old_type==ECEA)&&((ce_id%8)==0))
    loc_id=(cip_id*MAX_CC_PER_CIP)+(ce_id/8);
else continue;
    where cc_old_type is the old channel card type;
        DECA(Digital Channel Element Assembly) is the
            channel card including 4 channel elements;
        ECEA (Eight Channel Element Assembly) is the
            channel card including 8 channel elements;
        ce_id is the number of the channel elements;
        MAX_CC_PER_CIP is the maximum number of
            channel cards;
        loc_id is the location of the channel element to be
            processed per corresponding CIP; and
        cip_id is the identification number of CIP.
```

* * * * *